(12) United States Patent
Imai

(10) Patent No.: US 9,600,439 B2
(45) Date of Patent: Mar. 21, 2017

(54) NETWORK MANAGEMENT FOR OPTIMIZING CACHE LOCATION

(71) Applicant: FUJITSU LIMITED, Kawasaki-shi (JP)

(72) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 778 days.

(21) Appl. No.: 13/684,115

(22) Filed: Nov. 21, 2012

(65) Prior Publication Data

US 2013/0227168 A1 Aug. 29, 2013

(30) Foreign Application Priority Data

Feb. 29, 2012 (JP) ................................ 2012-044879

(51) Int. Cl.
| | | |
|---|---|---|
| *G06F 15/173* | (2006.01) | |
| *G06F 1/32* | (2006.01) | |
| *H04L 12/24* | (2006.01) | |
| *H04L 12/721* | (2013.01) | |
| *H04L 29/08* | (2006.01) | |

(52) U.S. Cl.
CPC ...... *G06F 15/17312* (2013.01); *G06F 1/3253* (2013.01); *H04L 41/12* (2013.01); *H04L 45/12* (2013.01); *H04L 67/2842* (2013.01); *Y02B 60/1235* (2013.01)

(58) Field of Classification Search
CPC . G06F 15/17312; G06F 1/3253; H04L 41/12; H04L 45/12; H04L 67/2842; Y02B 60/1235
See application file for complete search history.

(56) References Cited

U.S. PATENT DOCUMENTS

| | | |
|---|---|---|
| 6,502,175 B1 | 12/2002 | Krishnan et al. |
| 2006/0007863 A1 | 1/2006 | Naghian |
| 2013/0315257 A1* | 11/2013 | Welin et al. .................. 370/401 |

FOREIGN PATENT DOCUMENTS

| | | |
|---|---|---|
| JP | 2005-538592 | 12/2005 |
| JP | 2008-311830 | 12/2008 |
| JP | 2010-199736 | 9/2010 |

OTHER PUBLICATIONS

OSPF Protocol—IETF RFC 2328 Version 2; J. Moy; Ascend Communications, Inc.; Apr. 1998.*
JPOA—Japanese Office Action mailed on Jul. 28, 2015 issued for corresponding Japanese Patent Application No. 2012-044879, with partial English Translation.

* cited by examiner

*Primary Examiner* — Cheikh Ndiaye
(74) *Attorney, Agent, or Firm* — Fujitsu Patent Center

(57) ABSTRACT

A location manager includes a memory and a processor coupled to the memory. The processor executes a process including extracting a combination of a transfer device and a path by using topology information indicating a relation of connections among transfer devices. The process including calculating a sum of an amount of electric power consumed by the transfer device being included in the combination to store the data and an amount of electric power consumed by transfer devices on a path included in the combination to transfer the data. The process including selecting a combination of which the sum of electric power calculated at the calculating is a minimum sum out of the combinations extracted at the extracting. The process including outputting information indicating the combination selected at the selecting.

8 Claims, 16 Drawing Sheets

FIG.9

| ROUTER 31 | |
|---|---|
| CONTENT | HIT COUNT |
| A | 1000 |
| B | 500 |
| ⋮ | ⋮ |
| Z | 150 |

⋮

| ROUTER 44 | |
|---|---|
| CONTENT | HIT COUNT |
| A | 600 |
| B | 200 |
| ⋮ | ⋮ |
| Z | 400 |

FIG.10

| CONTENT | HIT COUNT |
|---|---|
| A | 20000 |
| B | 50000 |
| ⋮ | ⋮ |
| Z | 100000 |

| CONTENT | CACHEABLE LOCATION |
|---|---|
| A | RouterID 0, 1, 2, 3, 4, 5, 6, 7, 8 |
| B | RouterID 0, 1, 5, 6 |
| C | RouterID 0 |

NETWORK MANAGEMENT FOR OPTIMIZING CACHE LOCATION

CROSS-REFERENCE TO RELATED APPLICATION

This application is based upon and claims the benefit of priority of the prior Japanese Patent Application No. 2012-044879, filed on Feb. 29, 2012, the entire contents of which are incorporated herein by reference.

FIELD

The embodiments discussed herein are directed to a location manager, an information processing system, a location design method, and a computer-readable recording medium.

BACKGROUND

Conventionally, there is known a technology to reduce an amount of traffic in a network thereby reducing electric power consumed by a network device. As an example of such a technology, there is known a CDN (Content Delivery Network) technology to place a copy of content in a plurality of servers on a core network or a metro network and deliver the content from the server geographically closest to a user. In a network to which the CDN technology is applied, content delivery is processed at the network edge; therefore, an amount of traffic flowing through the network is reduced, and electric power consumed by a network device is reduced.

Furthermore, there is known a CCN (Content Centric Network) technology to provide a cache function to a router on a network thereby easing restrictions on a cache location of content. In a network to which the CCN technology is applied, a router of a core network or a metro network caches a replica of content and delivers the cached content, thereby reducing an amount of traffic flowing through the network and reducing electric power consumed by a network device and a cost of device deployment.

Patent document 1: Japanese Laid-open Patent Publication No. 2010-199736

However, in the above-described technology to cause a server or a router to cache a replica of content, a cache location is set by taking into account only an amount of traffic on a network; therefore, there are problems that electric power consumed by the network and a cost associated with device deployment cannot be reduced appropriately.

Namely, when a server or a router caches a replica of content, power consumption associated with the use of a memory arises even if the server or router does not deliver the content, or a cost associated with deployment of the memory arises. Therefore, when a network causes many servers or routers to cache a replica of content, an amount of electric power and a device cost for caching the replica of content are increased, and consumed electric power and the device cost cannot be reduced appropriately.

SUMMARY

According to an aspect of an embodiment, a location manager includes a memory. The location manager includes a processor coupled to the memory. The processor executes a process including extracting a combination of a transfer device storing data and a path relaying the data from the transfer device to another transfer device requesting for the data by using topology information indicating a relation of connections among transfer devices. The process includes calculating, with respect to each of combinations extracted at the extracting, a sum of an amount of electric power consumed by the transfer device included in the combination to store the data and an amount of electric power consumed by transfer devices on a path included in the combination to transfer the data. The process includes selecting a combination of which the sum of electric power calculated at the calculating is a minimum sum out of the combinations extracted at the extracting. The process includes outputting information indicating the combination selected at the selecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram for explaining an example of a request list;

FIG. 10 is a diagram for explaining an example of a total request list;

DESCRIPTION OF EMBODIMENTS

Preferred embodiments of the present invention will be explained with reference to accompanying drawings.

[a] First Embodiment

Figure 1:
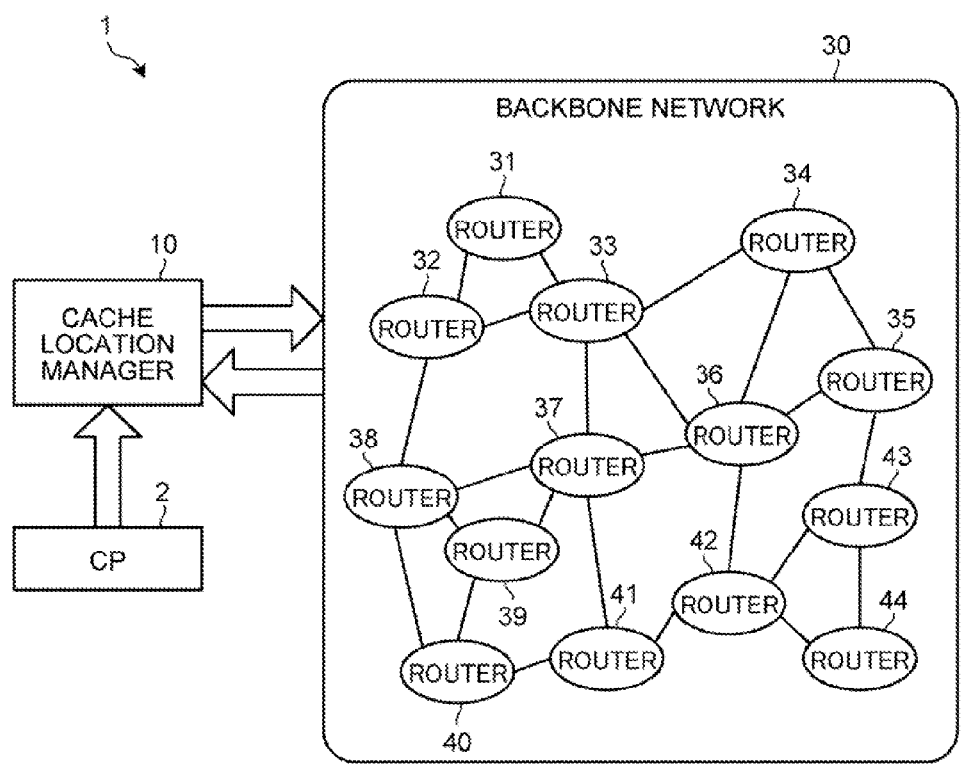
FIG. 1 is a diagram for explaining an information processing system according to a first embodiment.

In a first embodiment described below, an example of an information processing system 1 is explained with reference to FIG. 1. FIG. 1 is a diagram for explaining an information processing system according to the first embodiment. In the example illustrated in FIG. 1, the information processing system 1 includes a content provider (CP) 2, a cache location manager 10, and a backbone network 30.

The CP 2 provides content to a user via the backbone network 30 that a network company manages. The cache location manager 10 that the network company manages is a server (or an information processing device having central processing unit and memory, or a system having a plurality of information processing device) connected to routers 31 to 44 of the backbone network 30, and manages information on an origin server which is a server storing therein content placed by the CP 2. Furthermore, the cache location manager 10 stores therein topology information indicating a relation of connections among the routers 31 to 44 of the backbone network 30.

Figures 2, 3:
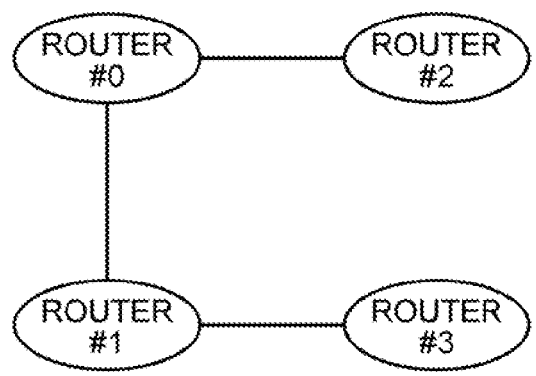
FIG. 2 is a diagram for explaining a network indicated by topology information.
FIG. 3 is a diagram for explaining an example of the topology information.

Here, the topology information managed in the cache location manager 10 is explained with reference to FIGS. 2 and 3. FIG. 2 is a diagram for explaining a network indicated by topology information. FIG. 3 is a diagram for explaining an example of the topology information. For example, the cache location manager 10 stores therein topology information indicating a relation of connections among four routers #0 to #3 illustrated in FIG. 2. Namely, the cache location manager 10 stores therein topology information indicating that the routers #0 and #1, the routers #0 and #2, and the routers #1 and #3 are connected.

Specifically, the cache location manager 10 stores therein the matrix form of topology information as illustrated in FIG. 3. Namely, the cache location manager 10 associates each of the routers #0 to #3 with a row and column of the topology information. Then, with respect to each element, when a router associated with a row is connected to a router associated with a column, the cache location manager 10 stores "1" as information indicating the connection between the routers. For example, in the example illustrated in FIG. 3, the topology information indicates that the routers #1 and #2 are connected to the router #0 and the router #3 is connected to the router #1.

To return to FIG. 1, the backbone network 30 includes the multiple routers 31 to 44 functioning as a hub of the network. The routers 31 to 44 are content delivery sites in the backbone network 30. Furthermore, the routers 31 to 44 each have a function of caching data of content and a function of delivering content on the basis of a request from a user (a client).

Figure 4:
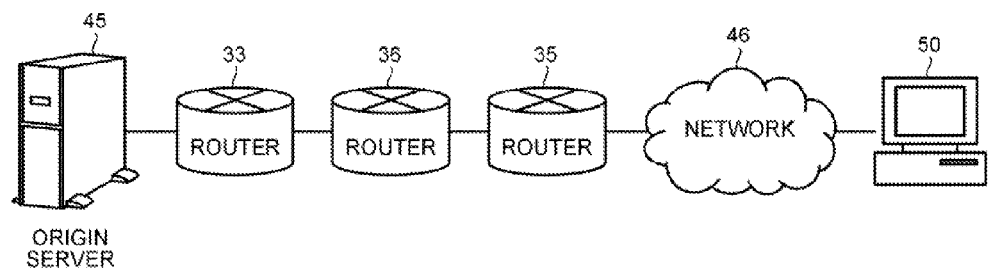
FIG. 4 is a diagram for explaining functions of a router.

Subsequently, the functions that the routers 31 to 44 according to the first embodiment have are explained with reference to FIG. 4. FIG. 4 is a diagram for explaining the functions of the router. Incidentally, FIG. 4 illustrates an example where only an origin server 45 holds content to be accessed. Furthermore, in the example illustrated in FIG. 4, a client 50, a source of access, is connected to the router 35 via a network 46, and issues a request for access to the content stored in the origin server 45.

For example, when the router 35 has received a request for delivery of the content having the origin server 45 from the client 50 via the network 46, the router 35 transmits a request for delivery of the content to the router 36. Likewise, the router 36 transfers the delivery request received from the router 35 to the router 33.

When having received the delivery request from the router 36, the router 33 transmits the delivery request to the origin server 45 in the site where the router 33 is. As a result, data of the content is delivered from the origin server 45 to the router 33, and the router 33 transfers the data of the content to the router 36. Then, the router 36 transmits the data of the content received from the router 33 to the router 35. After that, the router 35 transmits the content received from the router 36 to the client.

Here, when the routers 33, 35, and 36 are a content router having the content caching function, the routers 33, 35, and 36 perform the following process. Namely, the routers 33, 35, and 36 store a copy of the transmitted content. Then, when the routers 33, 35, and 36 have received the same delivery request, the routers 33, 35, and 36 transmit the stored content to a source of the delivery request without transferring the delivery request.

Furthermore, when the routers 33, 35, and 36 have stored the content subject to the delivery request, an amount of traffic flowing through the backbone network 30 is reduced, but an amount of stored data is increased. As a result, the routers 33, 35, and 36 reduce electric power consumed in the transfer of the data of the content; however, the routers 33, 35, and 36 increase electric power for caching the data of the content.

Therefore, depending on the number of accesses from a client, any one of the routers 33, 35, and 36 closest to the client or a server storing therein content stores data of the content. Namely, as for content frequently accessed by the client 50, the router 35 closest to the client 50 stores data of the content; as for content infrequently accessed by the client 50, the router 33 farthest from the client 50 stores data of the content.

For example, the routers 33 35 and 36 generate a request list indicating the number of accesses with respect to each content upon request from the cache location manager 10, and transmit the generated request list to the cache location manager 10. Then, the routers 33 to 35 store content data in accordance with a cache list delivered by the cache location manager 10.

Subsequently, a process performed by the cache location manager 10 is explained. The cache location manager 10 holds therein topology information of a network to be managed. Furthermore, the cache location manager 10 acquires a request list from each of the routers 31 to 44. Then, using the topology information, the cache location manager 10 extracts a router capable of caching content. Moreover, using the topology information, the cache location manager 10 extracts a content delivery path from a router which has stored content to a router in a site where a client which has requested the content is.

Incidentally, when extracting a delivery path of content, the cache location manager 10 extracts a path satisfying the following constraints. Namely, the cache location manager 10 extracts a delivery path starting from a router in a site where an origin server holding the content is to each site. Furthermore, the cache location manager 10 extracts a path through which the content can be delivered from the starting-point router to routers in all sites. Moreover, the cache location manager 10 extracts a path so that a router to store content can be uniquely determined. Furthermore, the cache location manager 10 extracts a path of one content so that the same content is not stored on the delivery path of the one content.

Furthermore, using the acquired request list, the cache location manager 10 identifies contents to be stored in descending order of the number of accesses to content. Then, the cache location manager 10 selects a combination of a router to store content and a path through which content is to be delivered from the previously-extracted routers and paths in descending order of the number of accesses to content.

Specifically, the cache location manager 10 selects a router in a site where an origin server having content is, and selects a path including the selected router as the root. Furthermore, when selecting a path of one content, the cache location manager 10 selects a path including a path selected for another content which has been stored in the same origin server as the one content and has the larger number of accesses than the one content. Namely, the cache location manager 10 selects a path so that the path has the larger the number of routers to store the content and the path has shorter length to delivering the content when the larger the number of accesses content has.

Then, with respect to each of all the selected combinations, the cache location manager 10 calculates a sum of an amount of electric power consumed in the caching of the content and an amount of electric power consumed in the delivery of the content through the selected path. After that, the cache location manager 10 selects one of the combinations of which the calculated sum of electric power amounts is a minimum sum, and creates a cache list indicating the selected combination. After that, the cache location manager 10 delivers the created cache list to the routers 31 to 44 of the backbone network 30.

Figure 5:
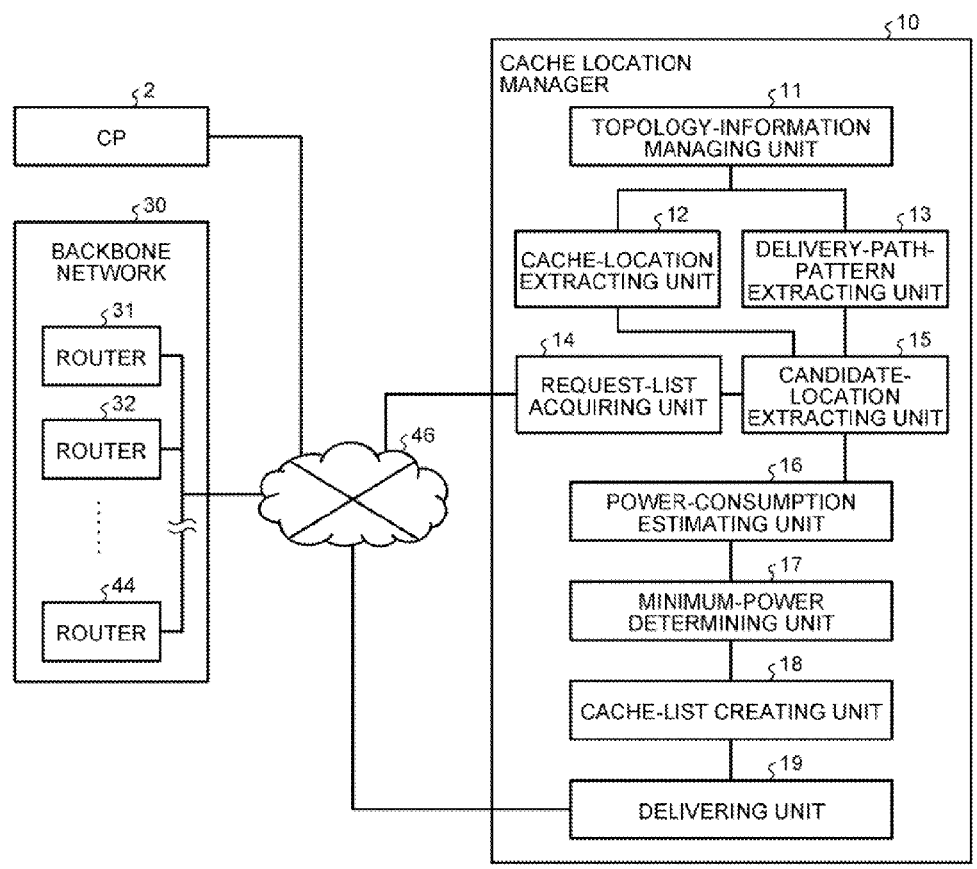
FIG. 5 is a diagram for explaining a functional configuration of a cache location manager according to the first embodiment.

Subsequently, a functional configuration of the cache location manager 10 is explained with reference to FIG. 5. FIG. 5 is a diagram for explaining the functional configuration of the cache location manager according to the first embodiment. In an example illustrated in FIG. 5, the cache location manager 10 includes a topology-information managing unit 11, a cache-location extracting unit 12, a delivery-path-pattern extracting unit 13, a request-list acquiring unit 14, a candidate-location extracting unit 15, a power-consumption estimating unit 16, a minimum-power determining unit 17, a cache-list creating unit 18, and a delivering unit 19.

The topology-information managing unit 11 manages topology information of the network 46. Then, the topology-information managing unit 11 transmits the managing topology information to the cache-location extracting unit 12 and the delivery-path-pattern extracting unit 13. Incidentally, the topology-information managing unit 11 can hold the topology information of the network 46 in advance, or can acquire the topology information from the outside.

The cache-location extracting unit 12 selects a candidate router capable of caching content using the topology information held in the topology-information managing unit 11. Then, the cache-location extracting unit 12 notifies the candidate-location extracting unit 15 of the selected candidate router.

The delivery-path-pattern extracting unit 13 identifies a relation of connections among the routers 31 to 44 indicated by the topology information upon receipt of the topology information. Furthermore, on the basis of the identified relation of connections, the delivery-path-pattern extracting unit 13 derives a delivery tree having the shortest transfer path between sites out of delivery trees including the routers 31 to 44 as the root in a tree-structured chart of the relation of connections among the routers 31 to 44. Then, the delivery-path-pattern extracting unit 13 extracts a candidate path connecting the routers 31 to 44 on the shortest delivery tree. Namely, when any one of the routers 31 to 44 has stored content, the delivery-path-pattern extracting unit 13 extracts all path patterns for delivery of the content to the other routers.

An example of how the delivery-path-pattern extracting unit 13 extracts a candidate path is explained below with reference to drawings. Incidentally, in the explanation below, there is described a process performed by the delivery-path-pattern extracting unit 13 when the delivery-path-pattern extracting unit 13 has acquired the topology information illustrated in FIG. 3. For example, when having acquired the topology information illustrated in FIG. 3, the delivery-path-pattern extracting unit 13 identifies a shortest delivery tree starting from the router #0 as the root and including the routers #1 to #3 as branches of the delivery tree.

Figure 6:
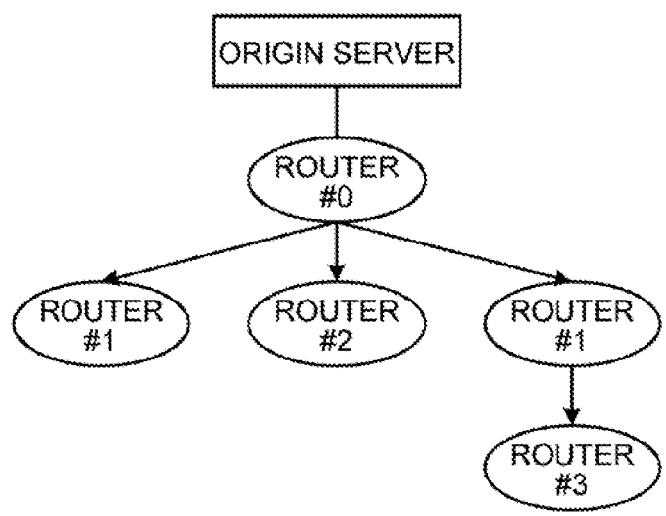
FIG. 6 is a diagram for explaining an example of a delivery tree.

FIG. 6 is a diagram for explaining an example of the delivery tree. As illustrated in FIG. 6, the delivery-path-pattern extracting unit 13 identifies a shortest delivery tree starting from the router #0 as the root and including the other routers #1 to #3 as branches of the delivery tree. Namely, when a server storing therein original content is connected to the router #0, the delivery-path-pattern extracting unit 13 identifies a delivery tree with content delivery paths from the router #0 to the other routers #1 to #3 as branches. Then, the delivery-path-pattern extracting unit 13 sets the branches of the identified delivery tree as candidate paths and generates a variable s indicating each candidate path.

Figure 7:
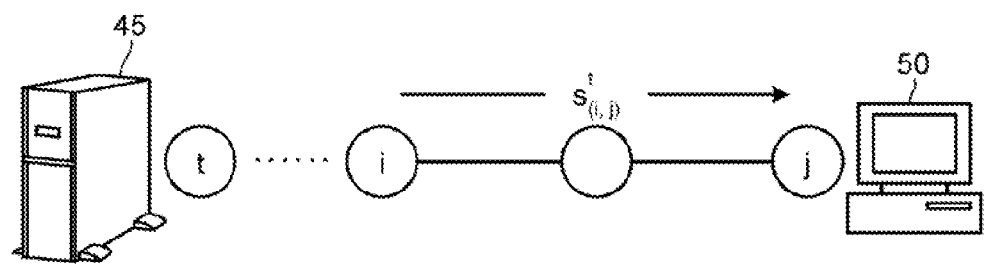
FIG. 7 is a diagram for explaining a candidate path indicated by a variable s.

Here, the variable "s" is explained with reference to FIG. 7. FIG. 7 is a diagram for explaining a candidate path indicated by the variable "s". For example, as illustrated in FIG. 7, a router connected to the origin server 45 is denoted by t, and a router connected to the client 50 is denoted by j. It is assumed that a candidate path for the delivery of content stored in the origin server 45 include a path from a router i to the router j. In such a case, the delivery-path-pattern extracting unit 13 generates $s^t_{(i,j)}$ as a variable indicating the path from the router i to the router j in the path for the delivery of content data stored in the origin server 45 in a site t. Then, the delivery-path-pattern extracting unit 13 notifies the candidate-location extracting unit 15 of the generated variable $s^t_{(i,j)}$ as a candidate path.

Figure 8:
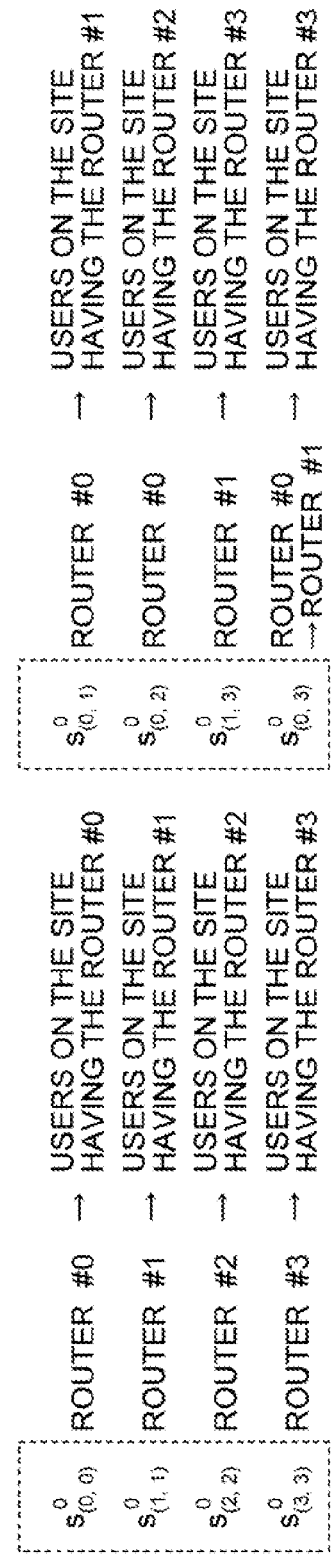
FIG. 8 is a diagram for explaining an example of information indicating a candidate route.

FIG. 8 is a diagram for explaining an example of information indicating the candidate path. As illustrated in FIG. 8, when setting the router #0 as the root, the delivery-path-pattern extracting unit 13 extracts eight candidate paths illustrated in FIG. 8, and notifies the candidate-location extracting unit 15 of the extracted candidate paths. Specifically, the delivery-path-pattern extracting unit 13 notifies the candidate-location extracting unit 15 of $s^0_{(0,0)}$ indicating a candidate path from the router #0 to requesting users on the site having the router #0, $s^o_{(1,1)}$ indicating a candidate path from the router #1 to requesting users on the site having the router #1, $s^o_{(2,2)}$ indicating a candidate path from the router #2 to requesting users on the site having the router #2, and $s^o_{(3,3)}$ indicating a candidate path from the router #3 to requesting users on the site having the router #3.

Furthermore, the delivery-path-pattern extracting unit 13 notifies the candidate-location extracting unit 15 of $s^o_{(0,1)}$ indicating a candidate path from the router #0 to requesting users on the site having the router #1 and $s^o_{(0,2)}$ indicating a candidate path from the router #0 to requesting users on the site having the router #2. Moreover, the delivery-path-pattern extracting unit 13 notifies the candidate-location extracting unit 15 of $s^o_{(1,3)}$ indicating a candidate path from the router #1 to requesting users on the site having the router #3 and $s^o_{(0,3)}$ indicating a candidate path from the router #0 to requesting users on the site having the router #3.

Likewise, the delivery-path-pattern extracting unit 13 extracts candidate paths when setting the other routers #1 to #3 as the root, and notifies the candidate-location extracting unit 15 of the extracted candidate paths.

To return to FIG. 5, the request-list acquiring unit 14 requests each of the routers 31 to 44 of the backbone network 30 to transmit a request list via the network 46. Then, when having acquired the request list from each of the routers 31 to 44, the request-list acquiring unit 14 calculates the number of accesses to each content using the acquired request list and notifies the candidate-location extracting unit 15 of the calculated number of accesses to each content.

FIG. 9 is a diagram for explaining an example of the request list. As illustrated in FIG. 9, the request-list acquiring unit 14 acquires a request list in which each content is associated with the hit count from each of the routers 31 to 44. The hit count here is information indicating how many requests for access to corresponding content a router storing the content has received.

Incidentally, in the example illustrated in FIG. 9, examples of request lists acquired from the routers 31 and 44 are depicted, and examples of request lists acquired from the other routers 32 to 43 are omitted. Furthermore, in the example illustrated in FIG. 9, an example of the hit count of contents "A", "B", and "Z" is depicted, and the hit count of the other contents is omitted.

In the example illustrated in FIG. 9, the request-list acquiring unit 14 receives from the router 31 the request list indicating that the hit count of the content "A" is "1000", the hit count of the content "B" is "500", and the hit count of the content "Z" is "150".

Furthermore, in the example illustrated in FIG. 9, the request-list acquiring unit 14 receives from the router 44 the request list indicating that the hit count of the content "A" is "600", the hit count of the content "B" is "200", and the hit count of the content "Z" is "400".

When having received the request lists illustrated in FIG. 9, the request-list acquiring unit 14 calculates a sum of the hit counts associated with each content in the request lists received from the routers 31 to 44. Then, the request-list acquiring unit 14 generates a total request list in which each content is associated with the calculated sum of the hit counts.

FIG. 10 is a diagram for explaining an example of the total request list. For example, the request-list acquiring unit 14 calculates "20000" as the sum of the hit counts of the content "A", "50000" as the sum of the hit counts of the content "B", and "100000" as the sum of the hit counts of the content "Z". Then, the request-list acquiring unit 14 creates a total request list illustrated in FIG. 10, and transmits the created total request list to the candidate-location extracting unit 15.

To return to FIG. 5, the candidate-location extracting unit 15 obtains a notification of a router capable of caching content from the cache-location extracting unit 12. Furthermore, the candidate-location extracting unit 15 obtains a notification of candidate paths for delivery of content from each router to the other routers from the delivery-path-pattern extracting unit 13. Moreover, the candidate-location extracting unit 15 obtains a total request list from the request-list acquiring unit 14.

Then, the candidate-location extracting unit 15 identifies the respective hit counts of contents in the total request list, and sequentially performs the following process on the contents in descending order of the hit count. First, the candidate-location extracting unit 15 extracts a candidate path including each router notified by the cache-location extracting unit 12 as the root from the candidate paths notified by the delivery-path-pattern extracting unit 13. At this time, the candidate-location extracting unit 15 extracts all candidate paths satisfying all the following constraints.

Namely, the candidate-location extracting unit 15 extracts a candidate path through which content can be delivered to all the routers 31 to 44 and of which the starting point is a router to store content. Furthermore, with respect to content having the higher hit count among contents stored in the same origin server as content of which the candidate path is to be extracted, the candidate-location extracting unit 15 extracts a candidate path certainly including an already-selected candidate path. Moreover, the candidate-location extracting unit 15 extracts a candidate path so as to prevent the same content from being stored on a path through which content is delivered.

Here, the constraints that a candidate path extracted by the candidate-location extracting unit 15 satisfies are explained. First, the candidate-location extracting unit 15 extracts a candidate path through which content can be delivered to all the routers 31 to 44. This constraint is a constraint for ensuring that content can be delivered to all clients connected to the routers 31 to 44 of the backbone network 30. Incidentally, to satisfy this constraint, the candidate-location extracting unit 15 extracts a candidate path satisfying the following equation (1).

$$\sum_i s^t_{(i,j)} = 1 \ \forall \ j \qquad (1)$$

Furthermore, the candidate-location extracting unit 15 selects a delivery path of which the starting point is a router to store content. This constraint is a constraint for ensuring that the content can be delivered to routers having requesting users. Incidentally, to satisfy this constraint, the candidate-location extracting unit 15 extracts a candidate path satisfying the following equation (2). Incidentally, $u_i$ in the equation (2) denotes a variable indicating whether content is stored in a router i; when content is stored in the router i, $u_i$ is "1", and, on the other hand, when content is not stored in the router $u_i$ is "0". And when the candidate-location extracting unit 15 selects a candidate path from the router i to site j, $s^t_{(i,j)}$ is "1", and, when the candidate-location extracting unit 15 does not select a candidate path from the router i to site j, $s^t_{(i,j)}$ is "0".

$$s^t_{(i,j)} \leq u_i \ \forall i,j \qquad (2)$$

Moreover, the candidate-location extracting unit 15 extracts a candidate path certainly including a path already selected for content having the larger number of accesses among contents stored in the same origin server. This constraint is explained below with reference to FIG. 11.

Figure 11:
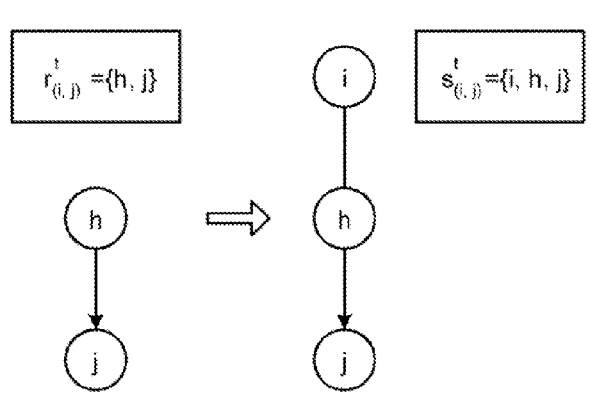
FIG. 11 is a first diagram for explaining an example of a constraint condition for a delivery path.

FIG. 11 is a first diagram for explaining an example of a constraint condition for a delivery path. For example, when extracting a path of content of which the number of accesses is "n", the candidate-location extracting unit 15 acquires $r^t_{(i,j)}=\{h, j\}$ as a path adopted for content having the same origin server t and the number of accesses larger than "n". In such a case, the candidate-location extracting unit 15 extracts $s^t_{(i,j)}=\{i, h, j\}$, which includes $r^t_{(i,j)}=\{h, j\}$, as a candidate path.

This constraint is a constraint to be satisfied when the CCN (Content-Centric Networking) technology is applied to the routers 31 to 44. Namely, when the CCN technology is applied to the routers 31 to 44, an access request from a client is sequentially transferred to a router in a site where an origin server is as long as content is not stored in any router on a path through which the request is transferred, and requested content is transmitted in the order in which the access request has been transferred. Therefore, a path from the router in the site where the origin server is to a router in a site where the client is includes a router to store content. Furthermore, content which has been stored in the same origin server and has the larger number of accesses is certainly on the path.

To satisfy this constraint, the candidate-location extracting unit 15 extracts $s^t_{(i,j)}=\{i, h, j\}$, which includes a path $r^t_{(i,j)}$ from a router h to the router j, as a candidate path of content which has been stored in the same origin server and has the number of accesses larger than "n". Specifically, the candidate-location extracting unit 15 extracts a candidate path satisfying the following equation (3). Incidentally, $r^t_{(h,j)}$–h in the equation (3) denotes a path ordering pair excluding the starting-point router h from an ordering sequence of the path $r^t_{(h,j)}$.

$$s^t_{(i,j)} = 0 \quad \begin{array}{l} \text{if } r^t_{(h,j)} \notin s^t_{(i,j)} \\ \vee \, s^t_{(i,j)} \in \{r^t_{(h,j)} - h\} \end{array} \quad \forall i, j \quad (3)$$

Incidentally, with respect to content of which the candidate path is to be extracted, the candidate-location extracting unit 15 can identify a path already selected for content having the same origin server and the larger number of accesses by using an arbitrary method. For example, as will be described later, the minimum-power determining unit 17 selects a combination resulting in the minimum power consumption among combinations of a router to store content and candidate paths through which content is to be delivered. Therefore, the candidate-location extracting unit 15 acquires the combination selected by the minimum-power determining unit 17. Then, the candidate-location extracting unit 15 can identify a path already selected for content which has been stored in the same origin server and has the larger number of accesses by using a candidate path included in the acquired combination.

Furthermore, the candidate-location extracting unit 15 extracts a candidate path of one content so that the same content is not stored on the delivery path of the one content. This constraint is a constraint for avoiding wasteful caching of content. Specifically, the candidate-location extracting unit 15 extracts a candidate path satisfying the following equation (4).

$$s^t_{(i,j)} + u_k \leq 1 \quad \forall i,j,k \in \{s^t_{(i,j)} - i\} \quad (4)$$

Figure 12:
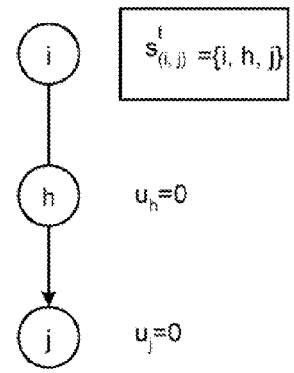
FIG. 12 is a second diagram for explaining an example of a constraint condition for a delivery path.

FIG. 12 is a second diagram for explaining an example of a constraint condition for a delivery path. For example, as illustrated in FIG. 12, the same content is not stored in routers h and j on a path $s^t_{(i,j)}=\{i, h, j\}$ for one content, so $u_h=0$ and $u_j=0$ hold true.

In this manner, the candidate-location extracting unit 15 extracts all candidate paths satisfying all of the above-described equations (1) to (4). Then, the candidate-location extracting unit 15 generates combinations of a router to store content and the extracted candidate paths, and notifies the power-consumption estimating unit 16 of all the generated combinations and the content to be delivered.

Namely, the candidate-location extracting unit 15 extracts multiple candidate paths satisfying all of the constraints with respect to a router to store one content. Then, the candidate-location extracting unit 15 generates all combinations of the router to store content and the extracted multiple candidate paths, and notifies the power-consumption estimating unit 16 of the generated combinations.

To return to FIG. 5, the power-consumption estimating unit 16 receives combinations of a router to store content and candidate paths through which content is to be delivered and the content to be delivered from the candidate-location extracting unit 15. Then, with respect to each of the acquired combinations, the power-consumption estimating unit 16 calculates a sum of an amount of electric power consumed by the router when caching the content and an amount of electric power consumed by the router when delivering the content through the candidate path. Then, the power-consumption estimating unit 16 notifies the minimum-power determining unit 17 of the combinations and the sum of electric power amounts calculated with respect to each of the combinations together with the content to be delivered.

How the power-consumption estimating unit 16 calculates a sum of electric power consumed is concretely explained below. First, using the following equation (5), the power-consumption estimating unit 16 calculates a sum of an amount of electric power consumed by the router when caching the content and an amount of electric power consumed by the router when delivering the content through a candidate path. Here, $Ca_{k,i}$ in the equation (5) denotes an amount of electric power consumed by a router i when a stored content is placed in the router i. Furthermore, $Tr_{k,(i,j)}$ in the equation (5) denotes an amount of electric power consumed in the delivery of content through a path $s^t_{(i,j)}$. Furthermore, the power-consumption estimating unit 16 calculates the equation (5) by manipulating the value of "i" and "j", where a path $s^t_{(i,j)}$ included in the combination is "1", a path $s^t_{(i,j)}$ not included in the combination is "0", $u_i$ included in the combination is "1", and $u_i$ not included in the combination is "0". In other words, the power-consumption estimating unit 16 design a value of $s^t_{(i,j)}$ and $u_i$ at the same time by manipulating the value of "i" and "j" to satisfy the equation (5).

$$\text{Minimize} \sum_{i \in V}\{Ca_{k,i} \cdot u_i\} + \sum_{(i,j) \in E}\{Tr_{k,(i,j)} \cdot s^t_{(i,j)}\} \quad (5)$$

Here, the power-consumption estimating unit 16 calculates $Ca_{k,i}$ using the following equation (6). Incidentally, $P_{ca}$ in the equation (6) denotes a power efficiency ([W/bytes]) of a memory that the router i has, and $D_k$ denotes a data amount ([bytes]) of content to be delivered.

$$Ca_{k,i}=D_k \cdot P_{ca} \quad (6)$$

Furthermore, the power-consumption estimating unit 16 calculates $Tr_{k(i,j)}$ using the following equation (7). Incidentally, $B_k$ in the equation (7) denotes a content transfer rate ([bps]) on a path from the router i to a router j. Furthermore, $R_{k,j}$ in the equation (7) denotes the number of requests for content to be delivered transmitted from the router j. Moreover, $P_r$ in the equation (7) denotes a power efficiency ([W/bps]) of the router. Furthermore, $P_{wdm}$ in the equation (7) denotes a power efficiency ([W/bps]) of a WDM (Wavelength Division Multiplexing) device. Moreover, $H(s^t_{(i,j)})$ denotes the number of hops on a path $s^t_{(i,j)}$.

$$Tr_{k,(i,j)}=B_k \cdot R_{k,j} \cdot (P_r+P_{wdm}) \cdot \{H(s_{(i,j)}^r)+1\} \quad (7)$$

Figure 13:
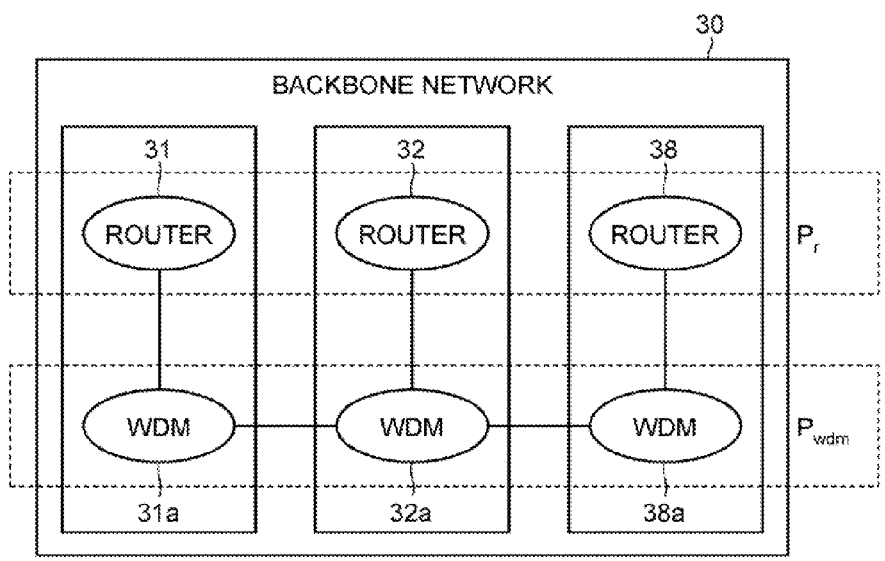
FIG. 13 is a diagram for explaining a power efficiency of a router.

Here, electric power consumed by a router is explained with reference to FIG. 13. FIG. 13 is a diagram for explaining a power efficiency of the router. Incidentally, in an example illustrated in FIG. 13, connections among the routers 31, 32, and 38 are depicted. As illustrated in FIG. 13, in the backbone network 30, WDM devices 31a, 32a, and 38a, devices for performing light wavelength multiplexing communication, are connected to achieve high-speed communication among the routers 31, 32, and 38. The WDM devices 31a, 32a, and 38a perform light wavelength multiplexing communication, thereby making the delivery of content fast.

Therefore, to calculate an amount of electric power consumed in the transfer of content in the backbone network 30, the power-consumption estimating unit 16 takes into account not only electric power $P_r$ consumed by the routers 31 to 44 but also electric power $P_{wdm}$ consumed by the WDM devices. Specifically, using the equation (7), the power-consumption estimating unit 16 calculates electric power $Tr_{k,(i,j)}$ consumed in the transfer of content. After that, the power-consumption estimating unit 16 notifies the minimum-power determining unit 17 of the combinations notified by the candidate-location extracting unit 15 and an amount of electric power calculated by using the equation (7).

To return to FIG. 5, the minimum-power determining unit 17 receives a notification of combinations of a router to store content and candidate paths through which content is to be delivered, a calculated amount of electric power, and the content is to be delivered from the power-consumption estimating unit 16. In such a case, with respect to each content to be delivered, the minimum-power determining unit 17 selects a combination of which the received amount of electric power is a minimum amount. Then, the minimum-power determining unit 17 notifies the cache-list creating unit 18 of the selected combination and the content to be delivered.

The cache-list creating unit 18 receives a notification of a combination of a router to store content and a candidate path through which content is to be delivered and the content to be delivered from the minimum-power determining unit 17. In such a case, with respect to each content to be delivered, the cache-list creating unit 18 creates a cache list indicating a router caching the content to be delivered.

Then, when the cache-list creating unit 18 has created cache lists indicating a router caching content to be delivered for all the contents to be delivered, the cache-list creating unit 18 transmits the created cache lists to the delivering unit 19.

The delivering unit 19 receives a cache list generated by the cache-list creating unit 18. Then, the delivering unit 19 delivers the received cache list to the routers 31 to 44 of the backbone network 30 via the network 46.

For example, the topology-information managing unit 11, the cache-location extracting unit 12, the delivery-path-pattern extracting unit 13, the request-list acquiring unit 14, the candidate-location extracting unit 15, the power-consumption estimating unit 16, the minimum-power determining unit 17, the cache-list creating unit 18, and the delivering unit 19 are electronic circuits. Here, as an example of the electronic circuit, an integrated circuit, such as an ASIC (Application Specific Integrated Circuit) or an FPGA (Field Programmable Gate Array), a CPU (Central Processing Unit) or an MPU (Micro Processing Unit), etc. is applied.

In this manner, the cache location manager 10 manages topology information indicating a relation of connections among the routers 31 to 44 of the backbone network 30. Furthermore, using the topology information, the cache location manager 10 extracts combinations of one or more routers to store content and candidate paths used in delivery of the content.

Then, with respect to each of the extracted combinations, the cache location manager 10 calculates a sum of an amount of electric power consumed by the router when caching the content and an amount of electric power consumed by the router when delivering the content through the candidate path. After that, the cache location manager 10 selects a combination of which the calculated sum of electric power amounts is a minimum sum, and outputs a cache list indicating the selected combination. Namely, using the equations (1) to (7), the cache location manager 10 works out a cache location and delivery path resulting in the minimum power consumption by treating them as a mathematical programming problem.

Therefore, the cache location manager 10 can reduce electric power consumed by the backbone network 30. Namely, in a conventional network, a router to store content is determined on the basis of only an amount of electric power consumed in the transfer of content by a router. Therefore, in the conventional network, when an amount of content to be stored is increased, electric power consumed in the caching of the content is also increased, and consequently power consumption cannot be reduced.

On the other hand, the cache location manager 10 extracts combinations of a router to store content and candidate paths for delivery of the content using topology information. Then, the cache location manager 10 selects a combination of which the sum of an amount of electric power consumed in the caching of the content and an amount of electric power consumed in the delivery of the content through the candidate path is a minimum sum among the extracted combinations, and notifies the routers 31 to 44 of the selected combination. Therefore, the cache location manager 10 can reduce power consumption of the backbone network 30.

Furthermore, with respect to content of which the candidate path is to be extracted, the cache location manager 10 extracts a path certainly including a candidate path already selected for content, which has been stored in the same origin server and has the larger number of accesses, as a candidate path. Namely, the cache location manager 10 extracts a candidate path through which content is to be delivered so that a delivery path of content held in the same origin server overlaps with the same shortest delivery tree. Consequently, the cache location manager 10 extracts a candidate path according to the constraints even when a cache hierarchy constraint exists on a path through which the routers 31 to 44 deliver content, and therefore can appropriately reduce the power consumption.

Namely, when the CCN technology is applied to the routers 31 to 44, the routers 31 to 44 sequentially transfer a request for content, and, when any of the routers 31 to 44 has stored the requested content, the router delivers the content through a path through which the content request has been transferred so that the content retraces the path. In such a case, the routers 31 to 44 are subject to a constraint that content, which has been stored in the same origin server as one content and has the larger number of accesses than the one content, certainly exists on a delivery path of the one content.

Figure 14A:
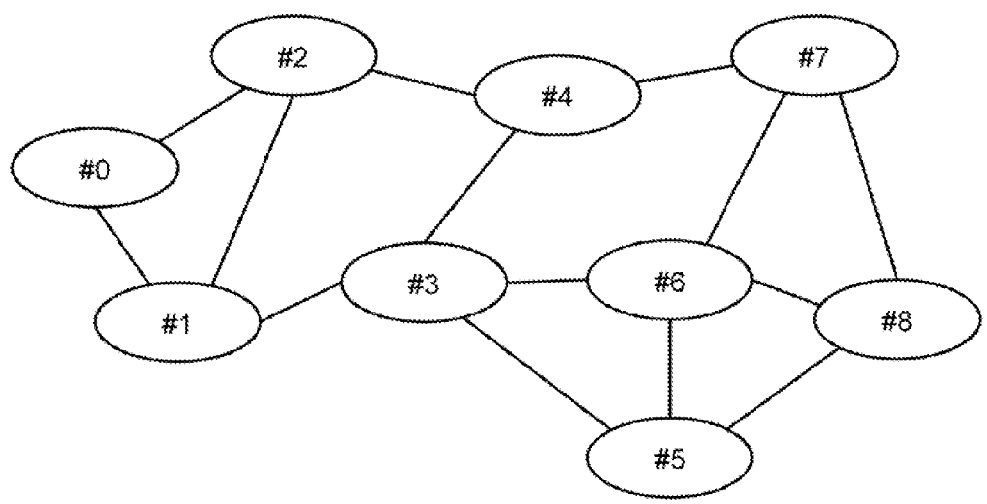
FIG. 14A is a first diagram for explaining a cache hierarchy constraint.

For example, FIG. 14A is a first diagram for explaining the cache hierarchy constraint. In an example illustrated in FIG. 14A, CCN-based cache delivery is performed on a topology in which routers #0 to #8 are connected. When content is delivered from origin servers connected to the routers #0, #4, and #8, respectively, to clients connected to the routers #0 to #8, the content is delivered through paths illustrated in (A), (B), and (C) of FIG. 14B.

Figure 14B:
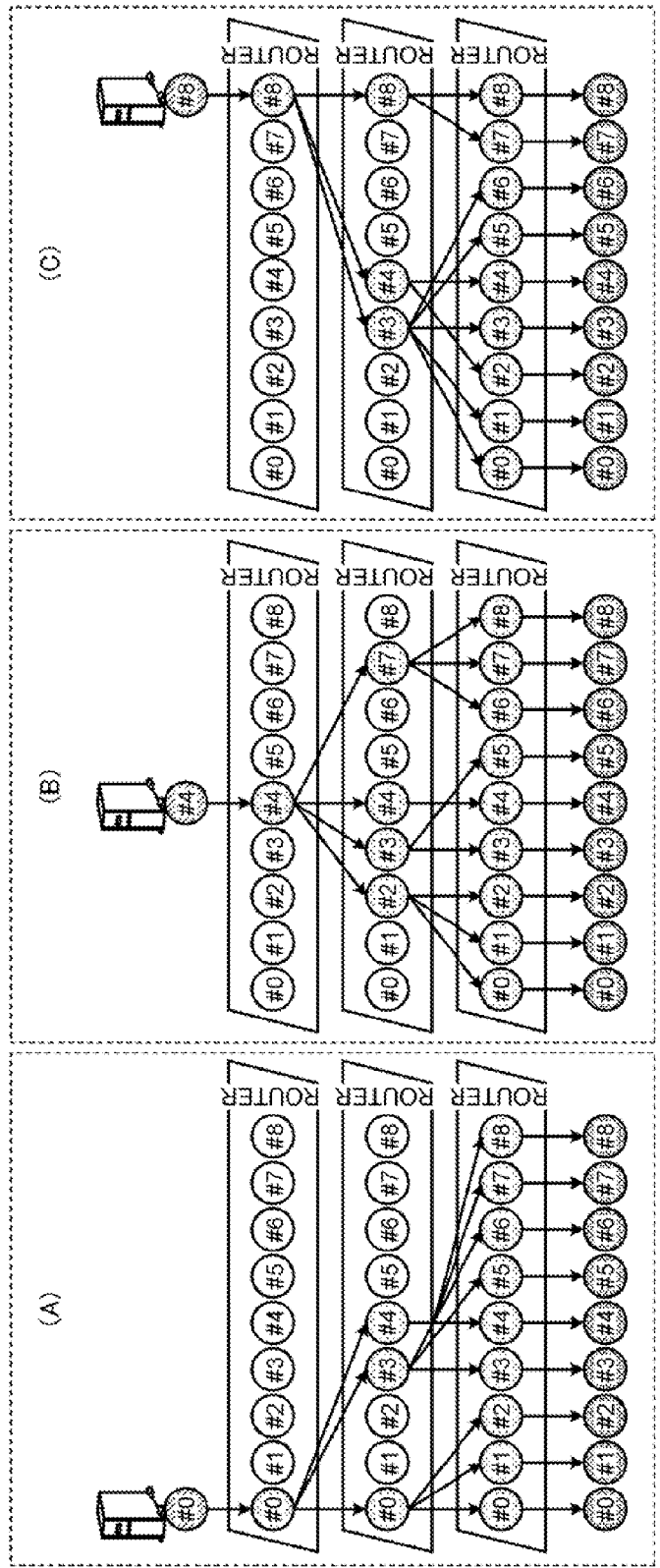
FIG. 14B is a second diagram for explaining the cache hierarchy constraint.

FIG. 14B is a second diagram for explaining the cache hierarchy constraint. For example, when content is delivered from the origin server connected to the router #0 to the clients, the routers #0 to #8 deliver the content through the path illustrated in (A) of FIG. 14B. Here, when all the routers #0 to #8 have stored all contents, an amount of traffic is reduced, but electric power consumed to store the contents is increased.

Therefore, as for frequently-accessed content, any of the routers #0 to #8 closer to a user on a transfer path stores the content; as for infrequently-accessed content, any of the routers #0 to #8 close to the origin server on a transfer path stores the content. In an example illustrated in (A) of FIG. 14B, out of contents held in the origin server connected to the router #0, frequently-accessed content is stored by the routers #0 to #8; on the other hand, infrequently-accessed content is stored by the router #0 only or the routers #0, #3, and #4.

Namely, contents stored in the same origin server are delivered through paths included in the same delivery tree. Then, out of contents stored in the same origin server, frequently-accessed content is stored by a router closer to a user. Therefore, when extracting a candidate path of one content, the cache location manager 10 extracts a candidate path certainly including a path of content having the larger number of accesses among contents stored in the same origin server.

Furthermore, as illustrated in (B) of FIG. 14B, when content held in the origin server connected to the router #4 is delivered to the clients, the routers #0 to #8 deliver the content through a different path from a path of content held in the origin server connected to the router #0. Moreover, as illustrated in (C) of FIG. 14B, when content held in the origin server connected to the router #8 is delivered to the clients, the routers #0 to #8 deliver the content through a different path from paths for contents stored in the origin servers connected to the routers #0 and #4.

Therefore, with respect to each router, the cache location manager 10 identifies a shortest delivery tree with each of the routers 31 to 44 as the root, and extracts branches satisfying constraints of the cache hierarchical structure and the like from branches of the identified delivery tree as candidate paths. Consequently, the cache location manager 10 can set a cache location taking into account the constraints even when the CCN technology is applied to the routers 31 to 44.

Figure 15:
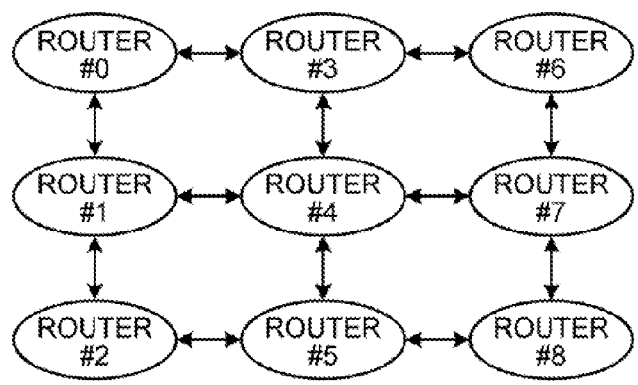
FIG. 15 is a diagram for explaining an example of a network subject to simulation.

Subsequently, a simulation result of the cache location set by the cache location manager 10 is explained with reference to drawings. First, a topology of a network subject to simulation is explained with reference to FIG. 15. FIG. 15 is a diagram for explaining an example of a network subject to simulation. In the example illustrated in FIG. 15, a network in which routers #0 to #8 are connected in a grid is subject to the simulation.

Figure 16:
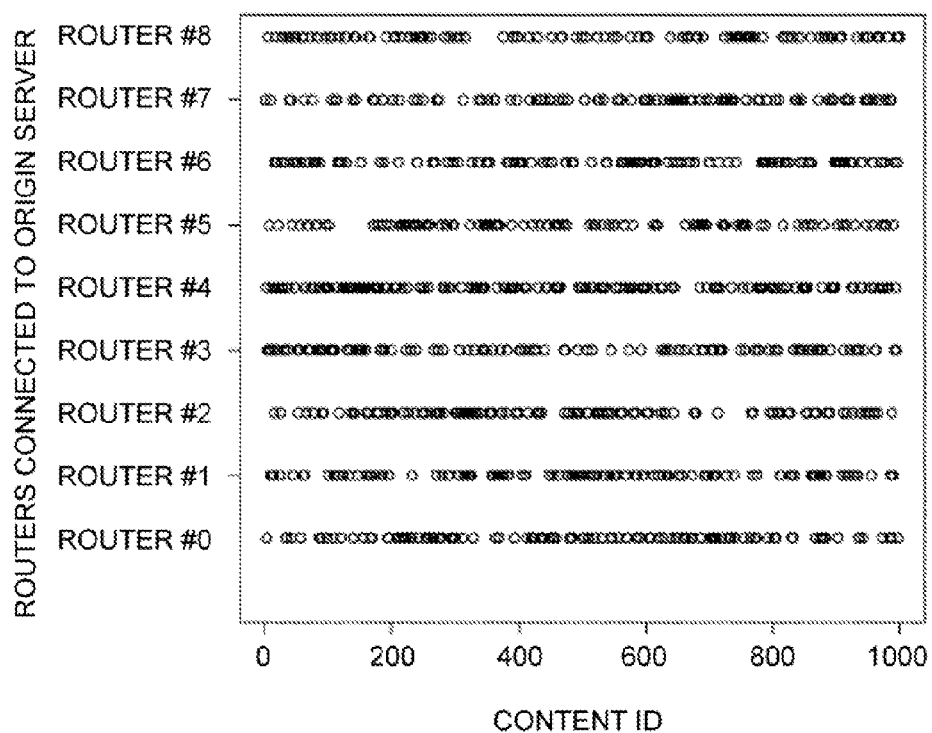
FIG. 16 is a diagram for explaining contents stored in an origin server connected to routers.

Subsequently, contents stored in an origin server connected to routers are explained with reference to FIG. 16. FIG. 16 is a diagram for explaining contents stored in an origin server connected to routers. As illustrated in FIG. 16, in the simulation described below, with respect to 1000 contents, an origin server connected to the routers #0 to #8 is randomly determined.

Furthermore, in the simulation described below, the size of each content is 14 megabytes (MB), and an average throughput of each content is 10 Mbps. Moreover, a DRAM (Dynamic Random Access Memory) that each of the routers #0 to #8 includes has a power efficiency of $3.125 \times 10^{-10}$ [W/bit]. Furthermore, the routers #0 to #8 have a power efficiency of $1.3 \times 10^{-8}$ [W/bps]. Moreover, respective WDM devices connected to the routers #0 to #8 have a power efficiency of $1.67 \times 10^{-9}$ [W/bps].

Figures 17, 18:
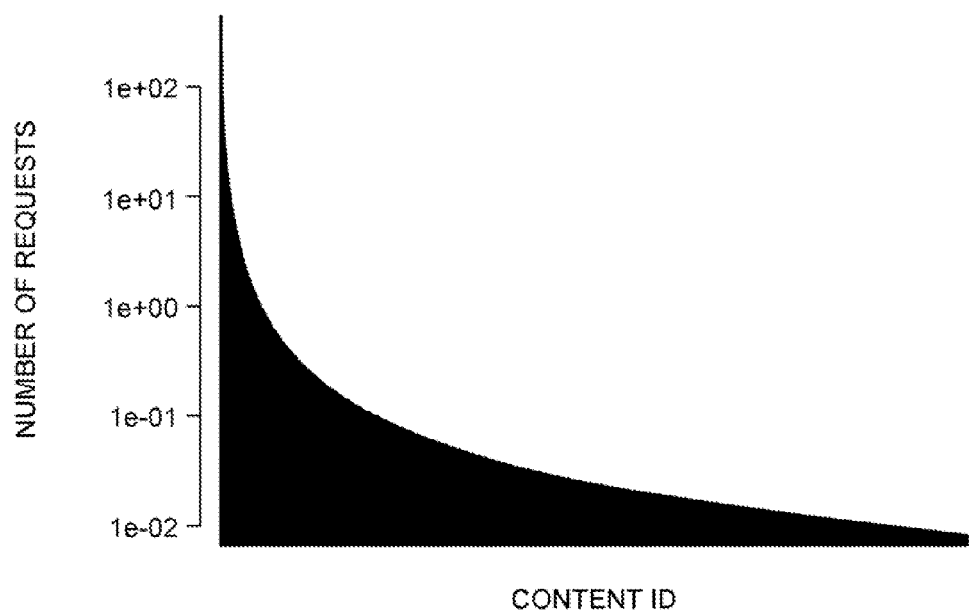
FIG. 17 is a diagram for explaining an example of request distribution.
FIG. 18 is a diagram for explaining an example of a cache list delivered by the cache location manager.

FIG. 17 is a diagram for explaining an example of request distribution. As illustrated in FIG. 17, in the simulation described below, the simulation is performed under the assumption that the number of requests decreases with increasing a content ID number in accordance with a Zipf distribution.

In such a case, the cache location manager 10 creates a cache list illustrated in FIG. 18. FIG. 18 is a diagram for explaining an example of a cache list delivered by the cache location manager. Incidentally, FIG. 18 depicts a cache list indicating respective cacheable locations of contents "A", "B", and "C" having an origin server in the same site #0. Incidentally, the respective numbers of accesses to the contents "A", "B", and "C" descend in this order.

In the example illustrated in FIG. 18, the cache location manager 10 generates a cache list indicating that a cacheable location of the content "A" is routers with router ID of "0", "1", "2", "3", "4", "5", "6", "7", and "8". Namely, the cache location manager 10 creates a cache list indicating that all the routers #0 to #8 can store the content "A" of which the number of accesses is larger than the other contents.

Furthermore, the cache location manager 10 creates a cache list indicating that routers with router ID of "0", "1", "5", and "6" can store the content "B". Namely, the cache location manager 10 creates a cache list indicating that the routers #0, #1, #5, and #6 can store the content "B" of which the number of accesses is moderate.

Moreover, the cache location manager 10 creates a cache list indicating that only a router with router ID of "0" can store the content "C". Namely, the cache location manager 10 creates a cache list indicating that the router #0 can store the content "C" of which the number of accesses is smaller than the other contents.

Figure 19:
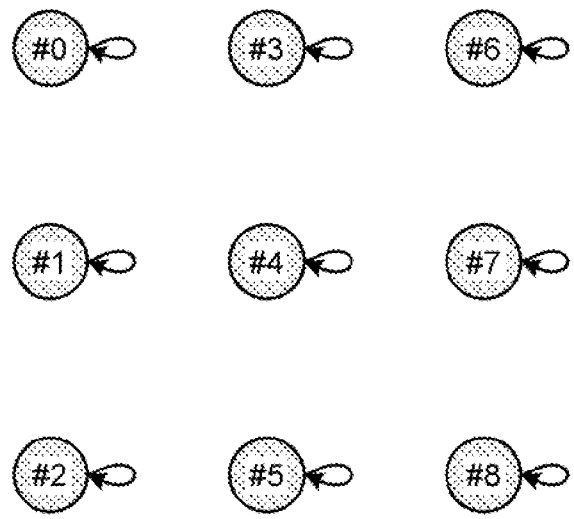
FIG. 19 is a diagram for explaining an example of cache locations of content A.
Figure 20:
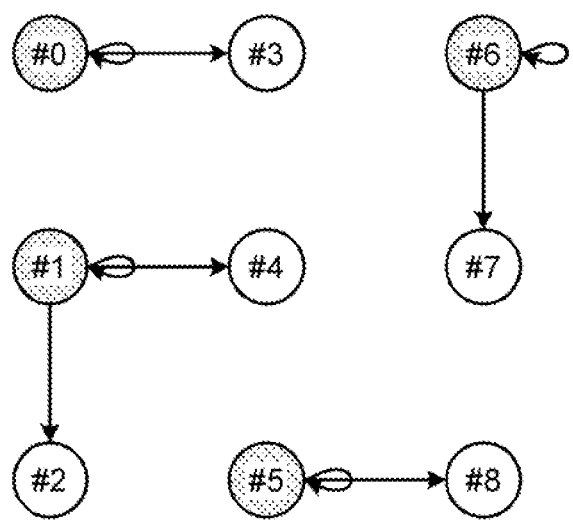
FIG. 20 is a diagram for explaining an example of cache locations of content B.
Figure 21:
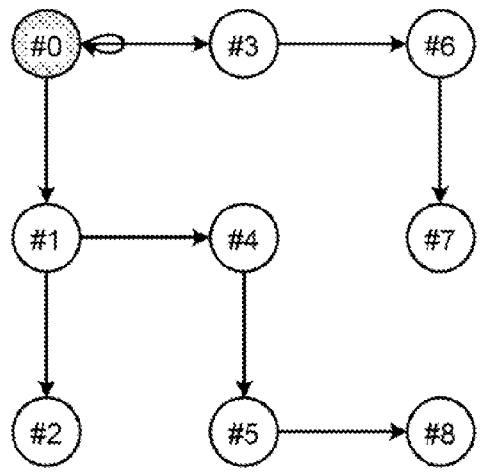
FIG. 21 is a diagram for explaining an example of a cache location of content C.

Subsequently, a path through which the routers #0 to #8, which have acquired the cache list illustrated in FIG. 18, deliver content is explained with reference to FIGS. 19 to 21. FIG. 19 is a diagram for explaining an example of cache locations of the content A. FIG. 20 is a diagram for explaining an example of cache locations of the content B. FIG. 21 is a diagram for explaining an example of a cache location of the content C.

In the example illustrated in FIG. 19, the routers #0 to #8 each store the content A. Therefore, when having received a request for access to the content A from a client, the routers #0 to #8 send data of the content A stored in the router in their own site to the client without transferring the access request to the other routers.

Furthermore, in the example illustrated in FIG. 20, the routers #0, #1, #6, and #5 store the content B. When the routers #0, #1, #6, and #5 have received a request for access to the content B from a client, the routers #0, #1, #6, and #5 send data of the content B stored in the router in their own site to the client without transferring the access request to the other routers. When the router #3 has received a request for access to the content B from a client, the router #3 transfers the access request to the router #0, and, when having received data of the content B sent from the router #0 in response to the access request, transfers the data of the content B to the client.

When the routers #2 and #4 have received a request for access to the content B from a client, the routers #2 and #4 transfer the access request to the router #1, and, when having received data of the content B sent from the router #1 in response to the access request, transfer the data of the content B to the client. When the router #7 has received a request for access to the content B from a client, the router #7 transfers the access request to the router #6, and, when having received data of the content B sent from the router #6 in response to the access request, transfers the data of the content B to the client. When the router #8 has received a request for access to the content B from a client, the router #8 transfers the access request to the router #5, and, when having received data of the content B sent from the router #5 in response to the access request, transfers the data of the content B to the client.

Moreover, in the example illustrated in FIG. 21, the router #0 stores the content C. Therefore, the other routers #1 to #8 acquire the content C from the router #0 through a path illustrated in FIG. 21, and transfer the acquired content C to a client. Specifically, the routers #1, #2, #4, #5, and #8 acquire the content C through a path passing through the router #0, the router #1, and the router #2 or a path passing through the router #0, the router #1, the router #4, the router #5, and the router #8. Furthermore, the routers #3, #6, and #7 acquire the content C through a path passing through the router #0, the router #3, the router #6, and the router #7.

Figure 22:
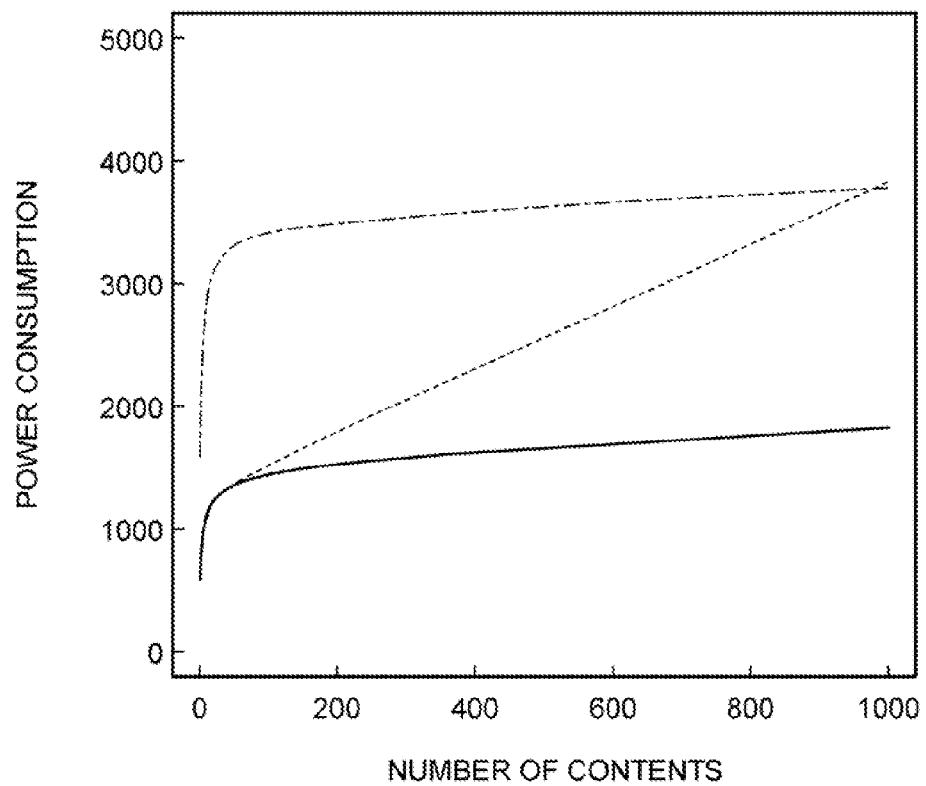
FIG. 22 is a diagram for explaining electric power consumed by an entire backbone network.

Subsequently, power consumption of the backbone network 30 is explained with reference to FIG. 22. FIG. 22 is a diagram for explaining electric power consumed by the entire backbone network. Incidentally, in an example illustrated in FIG. 22, with respect to each of the numbers of contents, power consumption of the backbone network 30 is plotted on a graph with the numbers of contents on the abscissa and power consumption (W) of the backbone network 30 on the ordinate.

In the example illustrated in FIG. 22, electric power consumed by the backbone network 30 when only one router has stored content is plotted by a dashed-dotted line. Furthermore, in the example illustrated in FIG. 22, electric power consumed by the backbone network 30 when all routers have stored content is plotted by a dashed line. Moreover, in the example illustrated in FIG. 22, electric power consumed by the backbone network 30 when content has been stored in accordance with a cache list delivered by the cache location manager 10 is plotted by a solid line.

As illustrated in FIG. 22, when content has been stored in accordance with the cache list delivered by the cache location manager 10, electric power consumed by the backbone network 30 can be kept lower than those in the other two methods.

Figure 23:
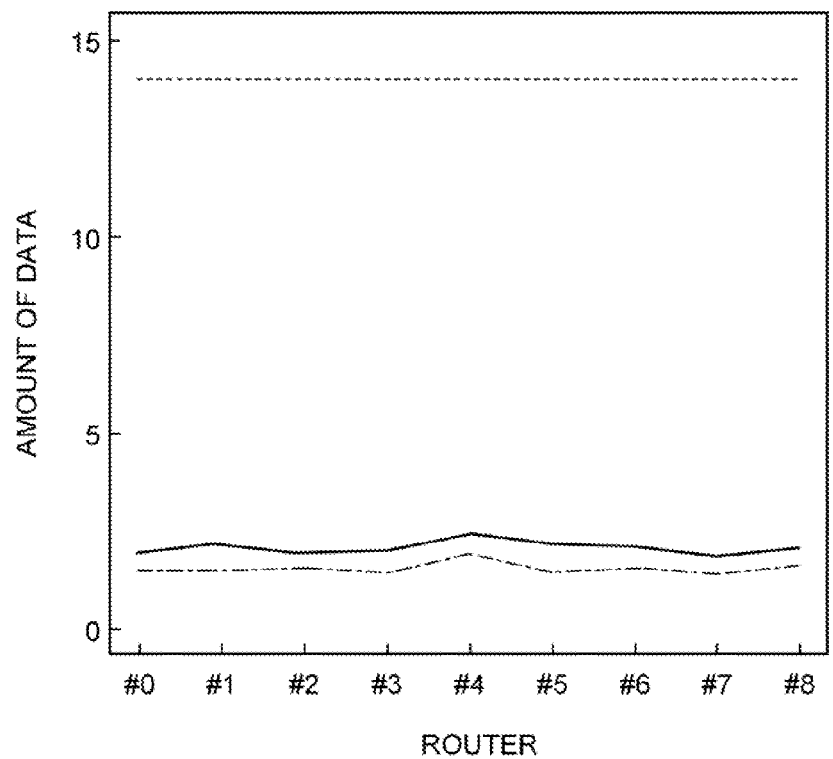
FIG. 23 is a diagram for explaining an amount of data stored by each router.

FIG. 23 is a diagram for explaining an amount of data stored by each router. Incidentally, in an example illustrated in FIG. 23, an amount of data stored by each of the routers #0 to #8 is plotted on a graph with the routers #0 to #8 on the abscissa and an amount (gigabytes) of data stored by each of the routers #0 to #8 on the ordinate.

In the example illustrated in FIG. 23, an amount of data stored by each of the routers #0 to #8 when only one router has stored content is plotted by a dashed-dotted line. Furthermore, in the example illustrated in FIG. 23, an amount of data stored by each of the routers #0 to #8 when all routers have stored content is plotted by a dashed line. Moreover, in the example illustrated in FIG. 23, an amount of data stored by each of the routers #0 to #8 when content has been stored in accordance with a cache list delivered by the cache location manager 10 is plotted by a solid line.

As illustrated in FIG. 23, when content has been stored in accordance with the cache list delivered by the cache location manager 10, an amount of data stored by each of the routers #0 to #8 slightly increases than that is when one router stores content. However, each of the routers #0 to #8 stores a smaller amount of data than that is when all the routers #0 to #8 store data of all contents. Consequently, the cache location manager 10 can appropriately reduce electric power consumed by the routers #0 to #8.

Figure 24:
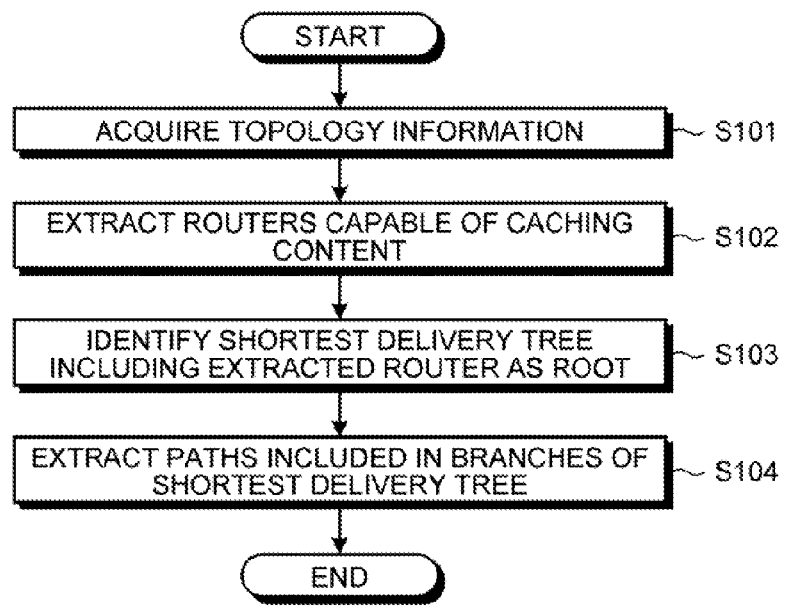
FIG. 24 is a flowchart for explaining the flow of a process performed by the cache location manager using topology information.

Subsequently, the flow of a process performed by the cache location manager 10 is explained with reference to drawings. First, the flow of a process for the cache location manager 10 to extract a router to store content and a candidate path using topology information is explained with reference to FIG. 24. FIG. 24 is a flowchart for explaining the flow of the process performed by the cache location manager using topology information.

First, the cache location manager 10 acquires topology information of the backbone network 30 to be managed (Step S101). Next, the cache location manager 10 extracts all routers capable of caching content using the topology information (Step S102). Then, the cache location manager 10 identifies a shortest delivery tree including the extracted router as the root (Step S103). After that, the cache location manager 10 extracts paths included in branches of the shortest delivery tree (Step S104), and ends the process.

Figure 25:
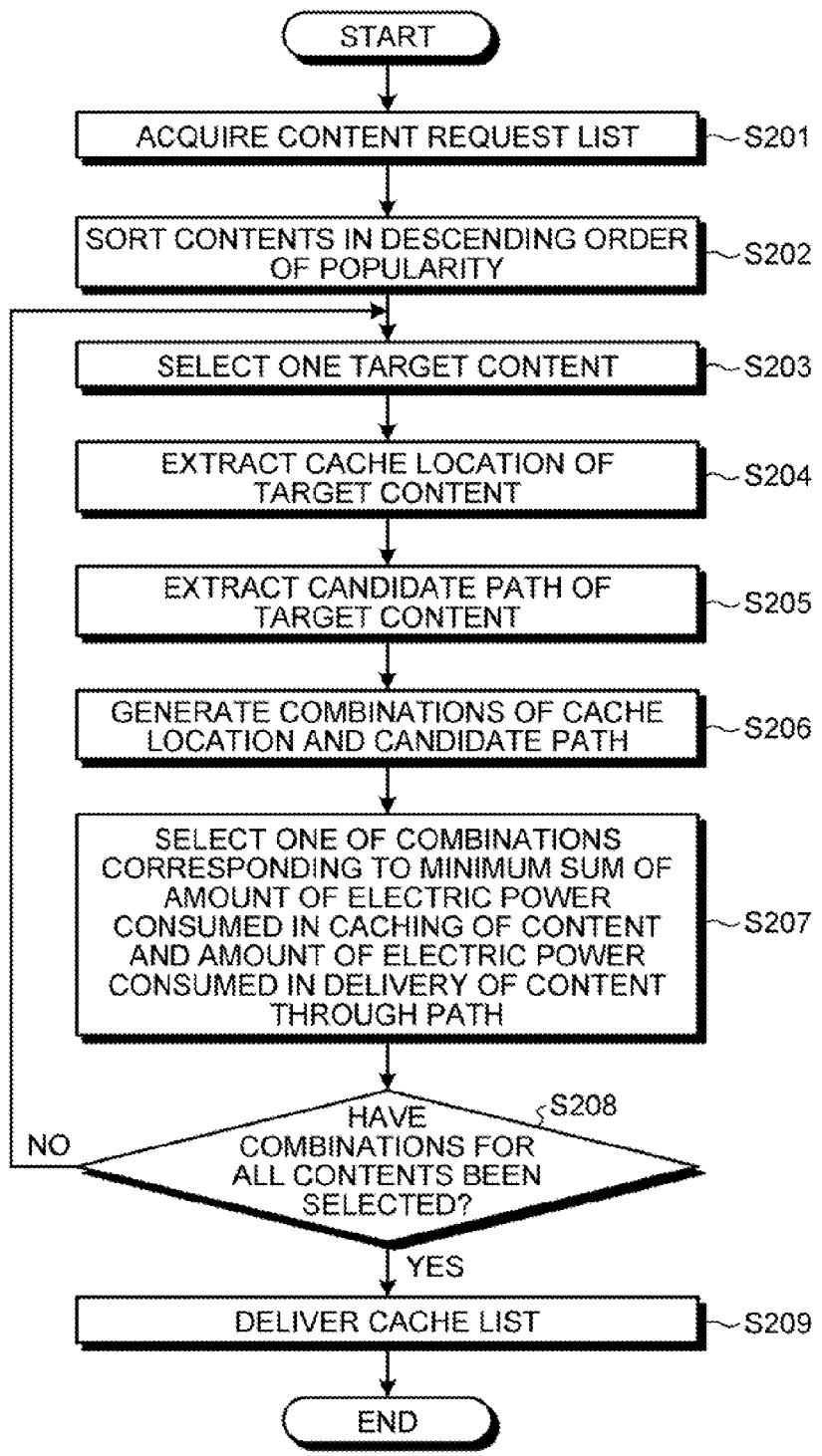
FIG. 25 is a flowchart for explaining the flow of a process for the cache location manager to select a cache location of content.

Subsequently, the flow of a process for the cache location manager 10 to select a cache location of content is explained with reference to FIG. 25. FIG. 25 is a flowchart for explaining the flow of the process for the cache location manager to select a cache location of content.

First, the cache location manager 10 acquires a request list from each of the routers 31 to 44 of the backbone network 30 (Step S201). Next, using the request lists, the cache location manager 10 sorts contents in descending order of popularity, i.e., in descending order of the number of accesses (Step S202). Then, the cache location manager 10 selects one content having the highest popularity as target content from the sorted contents (Step S203).

Then, the cache location manager 10 extracts a cache location of the target content (Step S204). Namely, the cache location manager 10 extracts a router in a site where an origin server storing therein the target content is as a cache location. Then, the cache location manager 10 extracts, as a candidate delivery path, a path satisfying a predetermined constraint out of candidate paths extracted from the shortest delivery tree including the router extracted at Step S204 as the root (Step S205).

Then, the cache location manager 10 generates combinations of the extracted cache location and candidate paths (Step S206). Then, the cache location manager 10 selects one of the combinations corresponding to a minimum sum of an amount of electric power consumed in the caching of the content and an amount of electric power consumed in delivery of the content through the candidate path (Step S207).

Then, the cache location manager 10 determines whether respective combinations of a cache location and a candidate path for all contents have been selected (Step S208), and, when having determined that combinations for all contents have not been selected (NO at Step S208), performs the process at Step S203. Namely, the cache location manager 10 selects content having the highest popularity out of contents of which the combination of a cache location and a candidate path has not been selected. On the other hand, when having determined that combinations of a cache location and a candidate path for all contents have been selected (YES at Step S208), the cache location manager 10 delivers a cache list (Step S209), and ends the process.

Effects of First Embodiment

As described above, the cache location manager 10 manages topology information indicating a relation of connections among the routers 31 to 44 of the backbone network 30. Furthermore, using the topology information, the cache location manager 10 selects a router to store content and extracts combinations of the selected router and all candidate paths used in delivery of the content from the selected router to a router which does not store the content.

Then, with respect to each of the combinations, the cache location manager 10 calculates a sum of an amount of electric power consumed in the caching of the content and an amount of electric power consumed by routers included in the path when delivering the content through the candidate path. After that, the cache location manager 10 selects a combination of which the calculated sum of electric power amounts is a minimum sum, and delivers a cache list indicating the selected combination to the routers 31 to 44. Therefore, the cache location manager 10 can reduce power consumption of the backbone network 30. Furthermore, the cache location manager 10 can reduce the cost for device deployment.

Furthermore, the cache location manager 10 identifies a shortest delivery tree including a router to store content as the root to the other routers, and sets branches of the identified shortest delivery tree as candidate paths. Consequently, the cache location manager 10 can extract the shortest path for the delivery of content, and therefore can reduce electric power consumed in delivery of content in the backbone network 30 and the cost for device deployment.

Moreover, the cache location manager 10 extracts combinations of a router to store content and candidate paths so that a router which does not store content is included in any of paths including the router to store content as a starting point. Therefore, the cache location manager 10 can deliver arbitrary content to all clients connected to the routers 31 to 44.

Furthermore, the cache location manager 10 extracts a candidate path so that a path from a router to store content to a router in a site where a client is a single path. Therefore, the cache location manager 10 can avoid duplication of a path for the delivery of content.

Moreover, the cache location manager 10 extracts a router caching content and a candidate path for the delivery of the content in descending order of the number of accesses to content. Here, the cache location manager 10 extracts a path including a path selected for content which has been stored in the same origin server and has the larger number of accesses than content of which the candidate path is to be extracted. Therefore, even when the routers 31 to 44 deliver content using the CCN technology, the cache location manager 10 can set a cache location satisfying a cache hierarchy constraint of the CCN.

Furthermore, the cache location manager 10 creates a cache list specifying data to be stored by each of the routers 31 to 44 on the CCN, and delivers the created cache list to each of the routers 31 to 44. Therefore, the cache location manager 10 can automatically configure the settings for the routers 31 to 44 included in the backbone network 30.

[b] Second Embodiment

The embodiment of the present invention is described above; however, the present invention can be embodied in various different forms other than the above-described embodiment. Other embodiments included in the present invention are described below as a second embodiment.

(1) Backbone Network

The above-described backbone network 30 includes the routers 31 to 44 connected in a specific topology. However, the embodiment is not limited to this. Namely, the cache location manager 10 can reduce power consumption of routers connected in any topology. Furthermore, the backbone network 30 is not limited to a core network or a metro network, and can be configured in any other forms. Furthermore, the backbone network 30 can includes network nodes which are any devices having the function of caching data of content and the function of delivering content on the basis of a request from the user (the client) in place of routers 31 to 44.

Furthermore, another technology other than the CCN can be applied to the routers 31 to 44. Namely, the cache location manager 10 can extract a path taking into account a constraint based on a protocol applied to the routers 31 to 44 besides the cache hierarchy constraint of the CCN.

(2) Equations

The cache location manager 10 selects a cache location and delivery path resulting in the minimum amount of power consumption using the above-described equations (1) to (7). However, the embodiment is not limited to this. Namely, any other equations can be adopted as long as the cache location manager 10 can calculate electric power consumed in the caching of content by the routers 31 to 44 and electric power consumed in the delivery of the content by the routers 31 to 44. Furthermore, when a protocol other than the above-described protocol is applied to the routers 31 to 44, equations according to the protocol to be applied are adopted.

(3) Cache List

The above-described cache location manager 10 transmits a cache list to each of the routers 31 to 44, and each of the routers 31 to 44 stores data of content in accordance with the cache list. However, the embodiment is not limited to this. For example, the cache location manager 10 can be configured to design an appropriate cache location according to topology information of a newly-designed backbone network.

Furthermore, the cache location manager 10 can be configured to deliver a cache list with the addition of information indicating a path and deliver content using the information indicating the path included in the cache list. Moreover, the cache location manager 10 can be configured to periodically acquire a request list from each of the routers 31 to 44 and periodically extract an optimum cache location and content delivery path.

(4) Program

Figure 26:
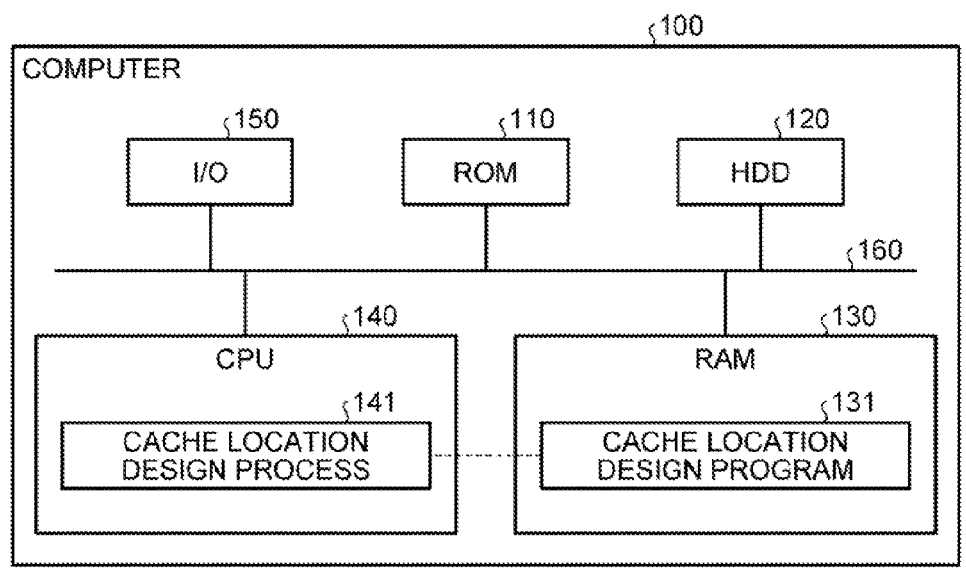
FIG. 26 is a diagram for explaining an example of a computer that executes a cache location program.

There is described the case where the cache location manager 10 according to the first embodiment implements various processes using hardware. However, the embodiment is not limited to this; the processes can be realized by causing a computer to execute a prepared program. An example of a computer that executes a program having the same functions as the cache location manager 10 described in the first embodiment is explained below with reference to FIG. 26. FIG. 26 is a diagram for explaining an example of a computer that executes a cache location program.

In a computer 100 illustrated in FIG. 26, a read-only memory (ROM) 110, a hard disk drive (HDD) 120, a random access memory (RAM) 130, and a central processing unit (CPU) 140 are connected by a bus 160. Furthermore, in the computer 100, an input/output interface (I/O) 150 for performing communication with another computer is also connected to the above devices by the bus 160.

A cache location design program 131 has been stored in the RAM 130; the CPU 140 reads out and executes the cache location design program 131, thereby the cache location design program 131 works as a cache location design process 141 in an example illustrated in FIG. 26. Incidentally, the cache location design process 141 fulfills the same function as the cache location manager 10 illustrated in FIG. 5.

Incidentally, the cache location program described in the present embodiment can be realized by causing a computer, such as a personal computer or a workstation, to execute a prepared program. This program can be distributed via a network, such as the Internet. This program is recorded on a computer-readable recording medium, such as a hard disk, a flexible disk (FD), a compact disc read only memory (CD-ROM), a magneto optical disc (MO), or a digital versatile disc (DVD). Furthermore, a computer can execute this program by reading the program from the recording medium.

According to one aspect of the invention, it is possible to reduce power consumption on a network. Incidentally, the invention can be interpreted as a mechanism to reduce not only an amount of power consumption but also a cost of device deployment, so electric power to be described below can be replaced with the device cost.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cache location manager including:
   a memory; and
   a processor coupled to the memory, wherein the processor executes a process comprising:
   extracting all combinations of a transfer device caching content and candidate paths relaying the content from the transfer device to another transfer device requesting for the content by using network topology information indicating a relation of connections among transfer devices, the candidate paths being extracted so that the candidate paths has larger number of transfer devices to store the content and shorter length to delivering the content when number of accesses to the content becomes larger;
   calculating, with respect to each of the combinations extracted at the extracting, a sum of an amount of electric power consumed by the transfer device included in the combination when the content is cached in the transfer device and an amount of electric power consumed by transfer devices included in the combination when transferring the content through the candidate paths;
   selecting, among the combinations, a combination of which the sum of electric power calculated at the calculating is a minimum sum out of the combinations extracted at the extracting; and
   outputting information indicating the combination selected at the selecting,
   wherein the outputting includes identifying a transfer device to cache the content on a content centric network in which each transfer device is allowed to cache the content based on the combination selected at the selecting, and providing a cache list indicating the content to be cached by each transfer device to the transfer devices.

2. The cache location manager according to claim 1, wherein
   the extracting includes identifying a delivery tree including the transfer device caching the data as a root and having the shortest route from the root to each transfer device, and setting branches of the delivery tree connecting transfer devices as a path.

3. The cache location manager according to claim 1, wherein
   the extracting includes extracting the combination of the transfer device caching the data and the path so that a transfer device which does not cache the data is included in any point of the path including the transfer device caching the data as a starting point.

4. The cache location manager according to claim 3, wherein
   the extracting includes extracting the combination of the transfer device caching the data and the path so that the path from the transfer device caching the data to the transfer device which does not cache the data is a single path.

5. The cache location manager according to claim 1, wherein
   the extracting includes extracting, by using data information indicating data to be transferred by the transfer devices and the number of accesses to each of the data, the combination of the transfer device caching the data and the path, sequentially from the data most accessed, so that the path selected at the selecting for first data includes a path selected at the selecting for second data, which is more accessed than the first data stored by an origin server connected with the transfer device connected with an origin server storing the second data.

6. An information processing system including a plurality of transfer devices having a data caching function and a data delivering function, and
   a cache location manager that specifies data to be cached by each transfer device and a path through which the data is to be delivered, wherein the cache location manager includes:
   a memory; and
   a processor coupled to the memory, wherein the processor executes a process comprising:
   extracting all combinations of a transfer device caching content and candidate paths relaying the content from the transfer device to another transfer device requesting for the content by using network topology information indicating a relation of connections among transfer devices, the candidate paths being extracted so that the candidate paths has larger number of transfer devices to store the content and shorter length to delivering the content when number of accesses to the content becomes larger;

calculating, with respect to each of the combinations extracted at the extracting, a sum of an amount of electric power consumed by the transfer device included in the combination when the content is cached in the transfer device and an amount of electric power consumed by transfer devices included in the combination when transferring the content through the candidate paths;

selecting, among the combinations, a combination of which the sum of electric power calculated at the calculating is a minimum sum out of the combinations extracted at the extracting; and outputting information indicating the combination selected at the selecting, wherein the outputting includes identifying a transfer device to cache the content on a content centric network in which each transfer device is allowed to cache the content based on the combination selected at the selecting, and providing a cache list indicating the content to be cached by each transfer device to the transfer devices.

7. A cache location design method performed by a cache location manager that specifies data to be cached by each transfer device and a path through which the data is to be delivered, the cache location design method comprising:

extracting, using a processor, all combinations of a transfer device caching content and candidate paths data and a path relaying the content from the transfer device to another transfer device requesting for the content by using network topology information indicating a relation of connections among transfer devices, the candidate paths being extracted so that the candidate paths has larger number of routers transfer devices to store the content and shorter length to delivering the content when number of accesses to the content becomes larger;

calculating, with respect to each of the combinations extracted at the extracting, a sum of an amount of electric power consumed by the transfer device included in the combination when the content is cached in the transfer device to cache the data and an amount of electric power consumed by transfer devices on a path included in the combination to transfer the data when transferring the content through the candidate paths, using the processor;

selecting, using the processor, among the combinations, a combination of which the sum of electric power calculated at the calculating is a minimum sum out of the combinations extracted at the extracting; and outputting information indicating the combination selected at the selecting, wherein the outputting includes identifying a transfer device to cache the content on a content centric network in which each transfer device is allowed to cache the content based on the combination selected at the selecting, and providing a cache list indicating the content to be cached by each transfer device to the transfer devices.

8. A computer-readable recording medium having stored therein a program for causing a computer to execute a cache location process comprising:

extracting all combinations of a transfer device caching content and candidate paths data and a path relaying the content from the transfer device to another transfer device requesting for the content by using network topology information indicating a relation of connections among transfer devices, the candidate paths being extracted so that the candidate paths has larger number of routers transfer devices to store the content and shorter length to delivering the content when number of accesses to the content becomes larger;

calculating, with respect to each of the combinations extracted at the extracting, a sum of an amount of electric power consumed by the transfer device included in the combination when the content is cached in the transfer device to cache the data and an amount of electric power consumed by transfer devices on a path included in the combination to transfer the data when transferring the content through the candidate paths;

selecting, among the combinations, a combination of which the sum of electric power calculated at the calculating is a minimum sum out of the combinations extracted at the extracting; and outputting information indicating the combination selected at the selecting, wherein the outputting includes identifying a transfer device to cache the content on a content centric network in which each transfer device is allowed to cache the content based on the combination selected at the selecting, and providing a cache list indicating the content to be cached by each transfer device to the transfer devices.

* * * * *